(12) United States Patent
Fetkovich et al.

(10) Patent No.: US 6,681,329 B1
(45) Date of Patent: Jan. 20, 2004

(54) INTEGRITY CHECKING OF A RELOCATED EXECUTABLE MODULE LOADED WITHIN MEMORY

(75) Inventors: John Edward Fetkovich, Endicott, NY (US); George William Wilhelm, Jr., Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/344,578

(22) Filed: Jun. 25, 1999

(51) Int. Cl.[7] .............................. G06F 11/30; H04L 9/00
(52) U.S. Cl. ...................... 713/189; 713/162; 713/187; 713/193
(58) Field of Search .................. 713/187, 189, 713/162, 193

(56) References Cited

U.S. PATENT DOCUMENTS

| | | | |
|---|---|---|---|
| 5,572,590 A | 11/1996 | Chess | 380/4 |
| 5,613,002 A | 3/1997 | Kephart et al. | 380/4 |
| 5,854,916 A | 12/1998 | Nachenberg | 395/500 |
| 6,070,239 A * | 5/2000 | McManis | 713/187 |
| 6,367,012 B1 * | 4/2002 | Atkinson et al. | 713/176 |

OTHER PUBLICATIONS

IBM Technical Disclosure Bulletin, "Virus Self–Protecting Test Program of Hard Disk Drive", vol. 37, No. 12, Dec. 1994, pp. 349–350.

* cited by examiner

*Primary Examiner*—Gilberto Barrón
*Assistant Examiner*—Courtney D. Fields
(74) *Attorney, Agent, or Firm*—William H. Steinberg, Esq; Kevin P. Radigan, Esq.; Heslin Rothenberg Farley & Mesiti P.C.

(57) ABSTRACT

Apparatus, method and computer program product are provided for performing integrity checking of a relocated executable module loaded within memory by an operating system loader. A repeatable digital signature is generated by determining the load address of the executable module in memory, normalizing at least some content of the executable module in memory employing the load address of the module, and then performing integrity analysis on a digital section of the module's content, including the normalized content, thereby deriving the repeatable digital signature.

34 Claims, 5 Drawing Sheets fig. 1 fig. 2 fig. 3A    fig. 3B fig. 4A fig. 4B

INTEGRITY CHECKING OF A RELOCATED EXECUTABLE MODULE LOADED WITHIN MEMORY

TECHNICAL FIELD

This invention relates to the field of detecting changes to digital information using digital signatures, and more particularly, to a technique for integrity checking an executable module loaded into memory by an operating system loader at other than a default location.

BACKGROUND OF THE INVENTION

A class of computer applications exist in which certain operations are performed, using certain data, either or both of which must be maintained secret. In general, this is not a problem since most users will simply use the application for its intended purpose and are unconcerned with the secrets contained therein. However, some users (i.e., "hackers") may try to pry into the application and its components, either to reveal the internal secrets or to modify the application in such a way as to perform restricted or prohibited operations. In general, hackers typically employ either static disassembly and analysis, or live debugging of the subject application in order to learn its operations. Once learned, the hacker can then modify the application according to an intended purpose. In response, tamper-resistant techniques are often applied to an application to inhibit these hacking attempts.

A variety of means can be employed to make an application and its components tamper-resistant. One of these is to make a digital "fingerprint" or signature of the application and its binary information. During initialization or at runtime (or both), modification of the protected application can be detected via an examination of this digital fingerprint in comparison to the current binary state of the application. When such activities or modifications are detected, the protected application can then intentionally fail in such a way that the secrets contained within are not exposed.

DISCLOSURE OF THE INVENTION

In general, a fingerprint or cryptographic check sum of a range of binary information is trivial to compute. However, for complex programs in the Windows or equivalent environment, there are issues that present problems in making the computations repeatable under all circumstances. For example, in such environments, the operating system loader does not always load the application program and its component modules (especially the component modules) at the same virtual address each time. If a module always loads at the same address, then a check sum across its bits as loaded into memory will always yield the same result. However, if the loader must "relocate" an executable module of an application program to a different base address within the virtual address space, then the loader will fix up certain code and data pointers within the loaded module so that code and data references continue to point to the proper, relocated addresses within the module. This is desired operation for the module so that it continues to function identically regardless of its load address, but is a problem for tamper-resistant measures since it virtually guarantees that a check sum (i.e., digital signature) of the module's loaded memory locations will not yield the same result, that is, compared with the application module on disk or loaded to a default location in memory. Thus, although the fix up of certain code and data pointers within the application module resulting from relocation of the module in memory is to be expected, these fix ups resemble to tamper-resistance code unauthorized modifications (i.e., tampering).

The problem solved by this invention, therefore, is to create a repeatable digital signature for a given executable module regardless of where in memory an operating system loader locates the module. Providing repeatability allows use of the digital signature in a tamper-resistance technique.

To briefly summarize, in a first aspect, a method is provided for checking integrity of an executable module loaded into memory. The method includes: determining a load address at which the executable module is loaded in memory; normalizing at least some content of the executable module in memory to obtain normalized content corresponding to the at least some content, the normalizing employing the load address at which the executable module is loaded in memory; and performing integrity analysis of the module's content, including the normalized content.

In another aspect, a system for checking integrity of an executable module loaded into memory is provided. The system includes means for determining a load address at which the executable module is loaded in memory, and means for normalizing at least some content of the executable module in memory to obtain normalized content corresponding to the at least some content. The means for normalizing includes means for employing the load address of the executable module in the memory. The system further includes means for performing integrity analysis of a digital section of the module's content, including the normalized content.

In a further aspect, an article of manufacture is provided which includes a computer program product having computer usable medium with computer readable program code means therein for use in checking integrity of an executable module loaded into memory. The computer readable program code means in the computer program product includes: computer readable program code means for causing a computer to effect determining a load address at which the executable module is loaded in memory; computer readable program code means for causing a computer to effect normalizing at least some content of the executable module in memory to obtain normalized content corresponding to the at least some content, the normalizing employing the load address of the executable module in memory; and computer readable program code means for causing a computer to effect performing integrity analysis of a digital section of the module's content, including the normalized content.

To restate, provided herein is a technique for performing integrity checking of an executable module of an application program subsequent to loading of the executable module into memory by an operating system loader, particularly at other than a default address. The integrity checking comprises generating a repeatable digital signature of the in-memory image of the loaded executable. The digital signature can then be used for initial validation of the loaded image and for subsequent real-time monitoring against changes to those bits in memory. Using the present invention, the in-memory bits can be employed as a form of validating signature before allowing an executable or DLL to access a protected resource. Another advantage is the ability to detect whether, after the executable has been loaded and verified, the in-memory image has been dynamically modified.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

In general, since code can be loaded into logical memory at different addresses depending upon resource availability, this invention discloses a technique whereby effects of loading at the different memory addresses are reversed (i.e., the content is "normalized") prior to checking the application bits. A signature thus generated from the loaded code is independent of the address at which the application is loaded and the resulting fix-ups performed by the operating system loader as described above.

As used herein, the following terms can be defined:

Executable module—A collection of digital information, typically comprising data and instructions to be executed by the processor of a computer. This collection of information is often stored as a 'file' on some medium such as a hard-drive, from which it is loaded into memory (or random-access memory, RAM) and executed. Examples of executable modules include (using common naming conventions), but are not limited to, 'executable' (files whose suffix is .exe or .com), dynamic link libraries (whose suffix is .dll), and device drivers (whose suffix may be, for example, .vxd .drv, .sys, or .mpd).

Logical address—The address in memory of a unit of digital code or data, as the address appears to a "high-level" program, such as an application or other executable module. Logical addresses may be translated to other types of addresses (e.g., physical) by the operating system or hardware of a computer.

Digital signature—A digital 'fingerprint' of a collection of digital data (such as the entirety or any subsection of an executable module). A digital signature, in order to be useful, typically has the following properties: 1) It is created by applying a concise, well-defined, repeatable process (typically mathematical) to a collection of digital data. 2) The digital signature has an extremely high likelihood of changing if any piece or pieces of the collection of digital data change. 3) For a digital signature to be effective, there should be a nearly zero likelihood of finding any sequence of digital data that results in the same digital signature as any other sequence of digital data. 4) The digital signature is relatively small when compared to the size of the collection of digital data to which the signature generating process is typically applied. Note that the signature generating process can vary from quite elementary and easy to defeat (such as a checksum), to cryptographically strong and secure methods, such as the Message Digest 5 hash (MD5).

Digital section—An executable module or some arbitrary subsection of an executable module. An executable module comprises one or more digital sections, which are deemed to be of interest and therefore worthy of having their integrity checked.

Digital data unit—Some arbitrary piece of digital data used in the creation of a digital signature. This might typically be an integral number of bytes, but could be any number of bits or bytes of data.

Module name—The symbol by which an executable module is known to the user. The module name is typically a series of alphabetic, numeric, and in some instances other characters found on a computer keyboard. Module names are stored by the 'file system' in use for a particular storage medium, such as a hard-drive.

Figure 1:
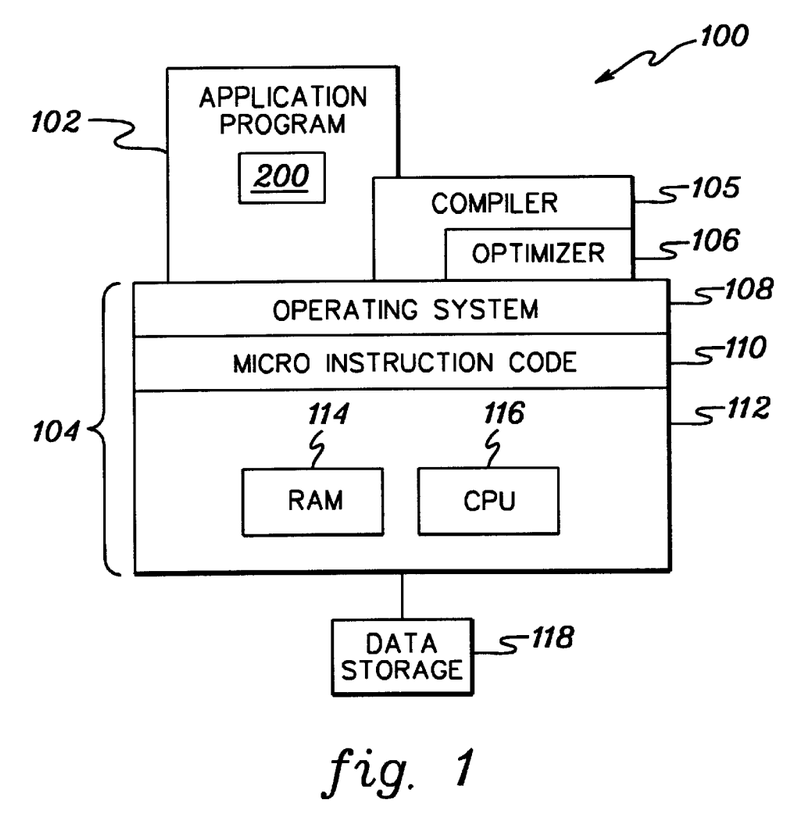
FIG. 1 is a block diagram of one embodiment of computer system hardware to employ tamper-resistance checking in accordance with the principles of the present invention.

Referring now to the drawings, wherein FIG. 1 is a block diagram showing a computer system 100 on which an embodiment of the present invention may operate. The embodiment includes one or more application programs, one program 200 of which is shown by way of example in FIG. 2. Another type of application program 102 is a compiler 105 which includes an optimizer 106. The compiler 105 and optimizer 106 are configured to transform a source program (like an application program 102) into optimized executable code. More generally, the source program is transformed to an optimized form and then into executable code. As part of this process, compiler 105 will assign a default load address for loading the executable code into memory, such as RAM 114, from a data storage device 118.

The compiler 105 and optimizer 106 operate on a computer platform 104 that includes a hardware unit 112. The hardware unit 112 includes one or more central processing units (CPU) 116, a random access memory (RAM) 114, and an input/output interface (not shown). Micro instruction code 110, for instance a reduced instruction set, may also be included on the platform 104. Various peripheral components may be connected to the computer platform 104, including a data storage device 118. A link may also be included to connect system 100 to one or more other similar systems (not shown).

An operating system 108 coordinates the operation of the various components of the computer system 100. An example of computer system 100 like this is the IBM RISC System/6000 (RISC System/6000 is a trademark of the IBM Corporation). It is readily understood by those skilled in the art that the concepts described hereinbelow are applicable to other types of computer systems 100, whether stand-alone systems or networked systems.

Figure 2:
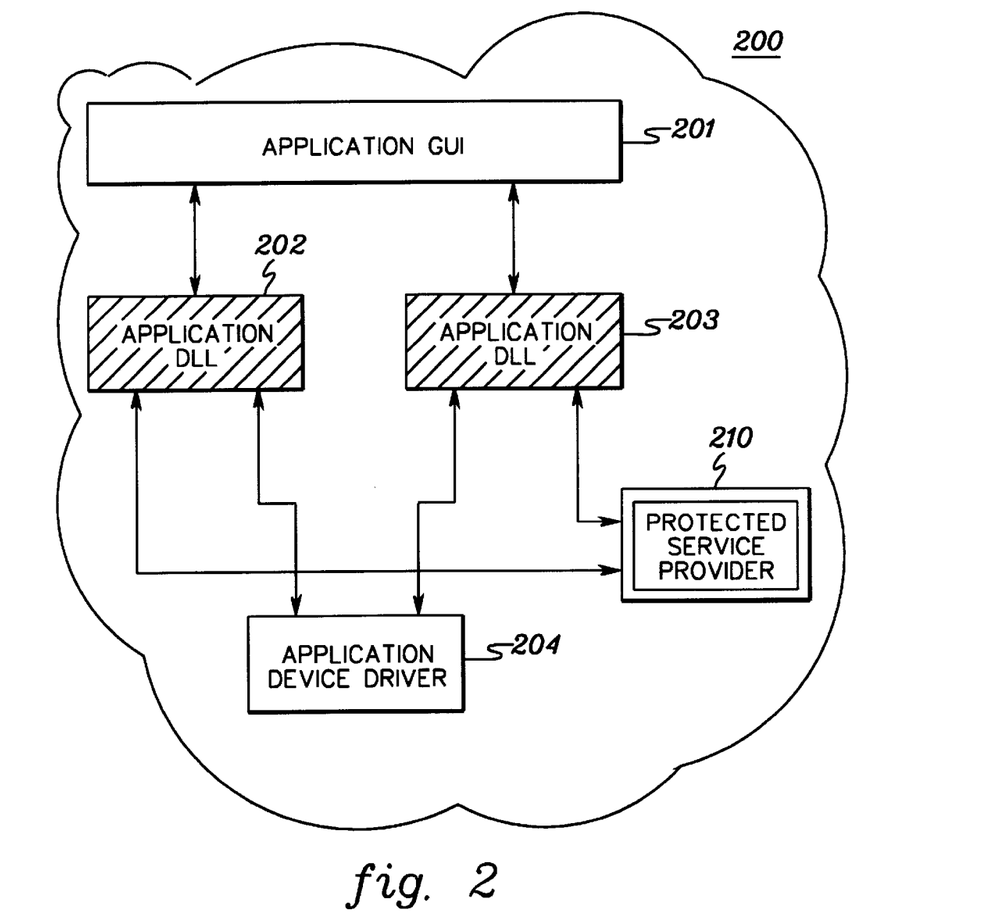
FIG. 2 depicts a system overview wherein an application comprises multiple executable modules 201, 202, 203 & 204 interfaced with a protected service provider 210, such as a descrambler for a digital video disc player.

As noted, FIG. 2 depicts one embodiment of an application program to employ the concepts of the present invention. Application program 200 includes an application graphical user interface (GUI) 201, a first application dynamic link library (DLL) 202, and a second application DLL 203. In this example, DLLs 202 and 203 comprise executable modules and interface with an application device driver 204, as well as to a protected service provider 210. Protected service provider 210 may comprise part of the application or be interfaced to the application, in which case the protected service provider could comprise a second application.

The protected service provider may contain confidential information, and in one embodiment implements tamper-resistance code in accordance with the principles of this invention. Because application DLLs 202 & 203 interface with the protected service provider 210, it is desirable to ensure that neither DLL has been modified for possible use in opening the protected service provider. Thus, application DLLs 202 & 203 are to undergo examination as a prerequisite to accessing the protected service provider, and may be periodically re-examined dynamically at run time. As one example, the protected service provider may comprise a descrambler module for a digital video disc player.

Figure 3A:
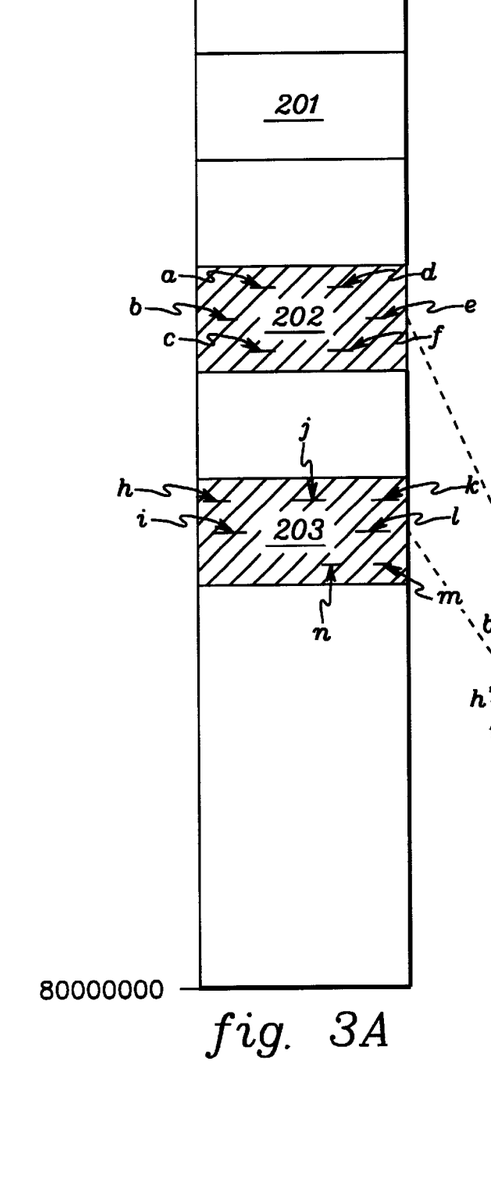
FIGS. 3a & 3b depict an exemplary memory map for application components 201, 202 & 203 of FIG. 2 at default load addresses, and at relocated load addresses, respectively, within the memory map.
Figure 3B:
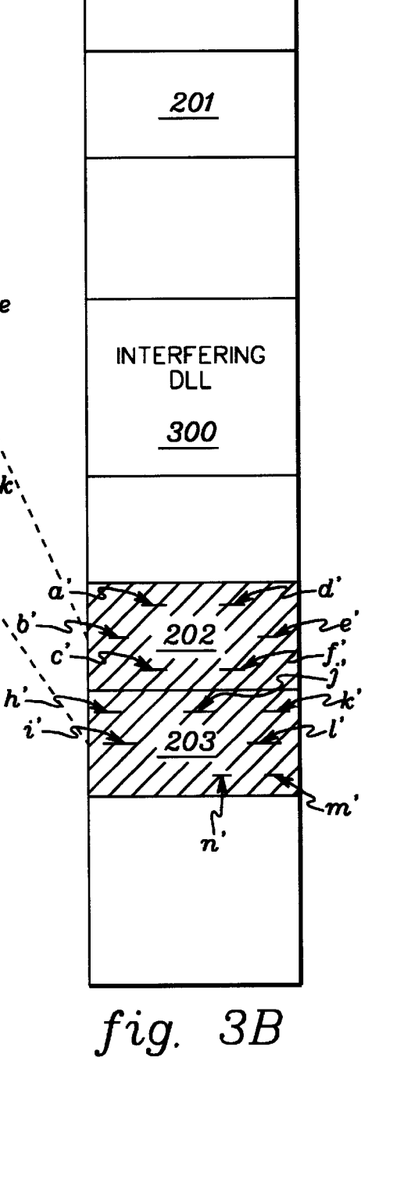

FIGS. 3A & 3B depict the problem addressed by the present invention in generating a repeatable digital signature. In the memory map of FIG. 3A, executable modules 201, 202 & 203 are assumed to be mapped to their respective default load addresses. Various units of digital data in executable module 202 (i.e., a, b, c, d, e & f) and units of digital data in executable module 203 (i.e., h, i, j, k, l, m & n) comprise content, such as an address pointer, which references another address within the respective executable modules and therefore has a value dependent upon where the executable module is loaded into memory. This is illustrated in FIG. 3B where an interfering DLL 300 has been mapped to memory before executable modules 202 & 203 and prevents loading of modules 202 & 203 at their default addresses. Since the base load addresses for these modules have changed, the address-dependent content of digital data units a–f & h–n must also correspondingly change, i.e., be "fixed-up" by the operating system loader. The modified digital data units are designated a'–f' and h'–n' in FIG. 3B.

Figure 4A:
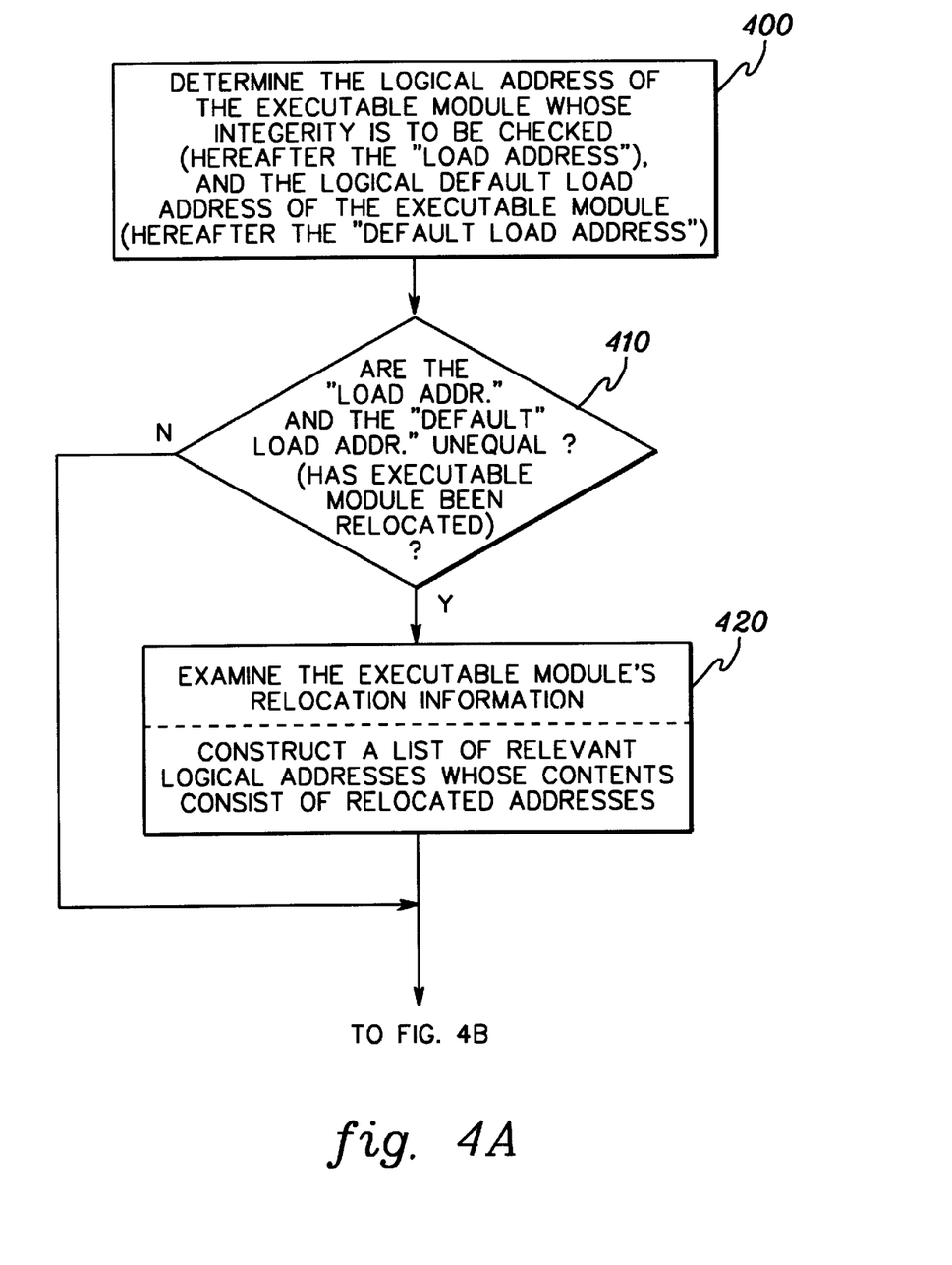
FIGS. 4a & 4b comprise a flowchart of one embodiment for integrity checking a digital section of an executable module loaded into memory in accordance with the principles of the present invention.
Figure 4B:
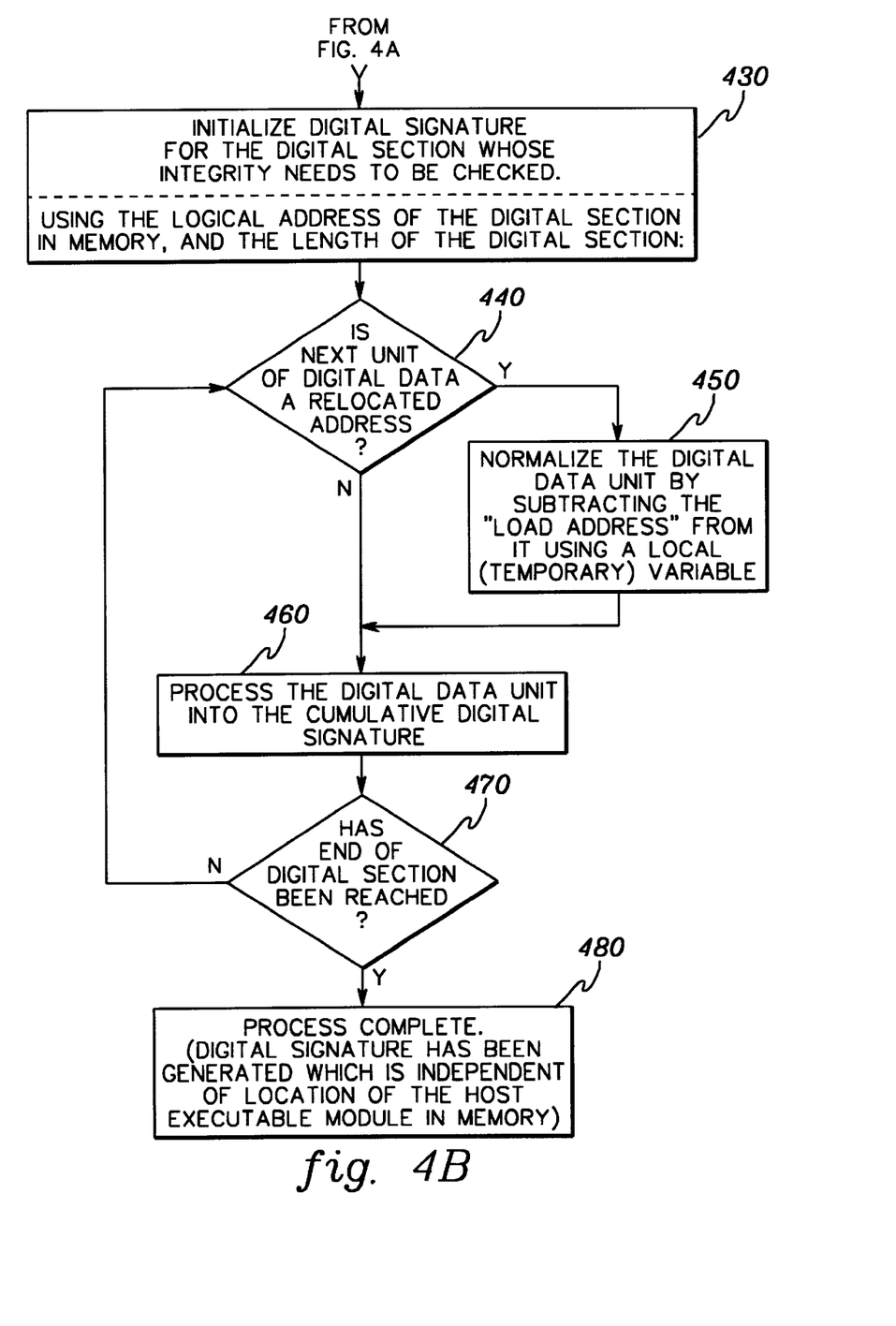

FIGS. 4a & 4b depicts an overview of one embodiment of integrity checking in accordance with the principles of the present invention. In this flowchart, a digital section of an executable module loaded into memory undergoes analysis for generation of a digital signature representative thereof. The digital section may comprise part of the executable module or the entire module.

Initially, the logical address or load address for the executable module whose integrity is to be checked is ascertained, as well as the logical default load address of the executable module, herein referred to as the "default load address" or "default address" 400. Next, a determination is made whether the load address and the default load address are unequal 410, i.e., has the executable module been relocated within memory from its default position? If so, the executable module's relocation information is examined in order to construct a list of relevant logical addresses within the module whose contents consist of relocated addresses themselves, e.g., comprise relocated address pointers to other addresses with the executable module 420. If the load address and the default load address are the same, then processing omits construction of the list of addresses.

Continuing with FIG. 4B, the digital signature for a particular digital section whose integrity is to be checked is next initialized 430. Using the logical address of the digital section in memory, as well as the length of the digital section, processing determines whether a next unit of digital data within the digital section comprises a relocated address 440. If yes, then the digital data unit is normalized by subtracting the base load address from the relocated address value. This can be accomplished using a local (temporary) variable 450. After normalization of the digital data unit, the unit is processed into the cumulative digital signature 460. By way of example, the cumulative digital signature could comprise a check sum or a cryptographic hash. After processing the digital data unit, inquiry is made whether the end of the digital section has been reached 470. If no, processing loops back to ascertain whether the next unit of digital data comprises a relocated address (440), otherwise, processing is complete for that digital section and a digital signature has been generated which is independent of the location of the executable module in memory 480. If multiple digital sections are to be checked, then in one embodiment processing returns from the yes branch of inquiry 470 to instruction 430 to initialize a digital signature for a next digital section.

By way of further explanation, in a Windows embodiment of this invention, application files and their component modules (dynamic link libraries, or DLLs) are stored in a known format. This format, the Portable Executable format, or PE for short, details everything about the module necessary to load it and run it, and to relocate it if necessary to a different virtual address. Specifically, in addition to the code and data sections of the file (.code and .data), there is an auxiliary section (.reloc) that contains a list of all the addresses in the program which must be fixed up by the loader as it relocates the binary to a new address. Normally, this data is used only by the loader in order to provide the fix-ups. However, the method presented herein proposes an alternate use of this information in order to solve the stated problem.

As an example, the method may include the following.

A. For any given module, the executable is built to load at a default address which is denoted as ADDRESS_BASE. In the Windows environment, this default address is almost always hexadecimal 0x00400000 for executable programs and 0x10000000 for DLLs. This default address can be determined by querying a field in the PE formatted executable file on the hard disk.

B. Once the module has been loaded into memory and is prepared to execute, the actual load address can also be queried from the operating system. This actual load address can be denoted as ADDRESS_LOAD. The difference between these two addresses, DELTA, is given by ADDRESS_LOAD minus ADDRESS_BASE. When the image is loaded into memory by the system loader, it traverses the set of all possible relocation records (given in the .reloc section of the file) and adds the DELTA value to all locations indicated in the relocation records. At this point, the program executable or DLL has been "fixed up" and will execute correctly.

C. If a signature must be computed across an address range of a loaded module, the PE file and its .reloc is consulted by the function implementing this method. The relocation records are brought from the disk file into this function's memory, e.g., as a sorted array of addresses.

Given a starting address and a length for the signature computation, this method will begin to compute the signature until the first address is encountered which has been relocated—this is known because of the list of relocations created in step B above. At this point, a temporary copy of the relocated data from memory is created and the DELTA value is subtracted from it, thus normalizing the value to its unrelocated state. This temporary value is then included in the signature computation. This process is repeated: including consecutive unrelocated bits into the signature until the next relocated data is reached, at which point that relocated data is normalized and factored into the signature computation. Once the end of the desired signature range has been reached, the resulting signature value is the normalized signature for the binary region of interest. This value will always be the same regardless of any relocation effects.

The signature value derived above is then used. This signature can be used in a variety of ways: it can be a simple go no-go test (the signature of this binary does not match what is expected, therefore it is invalid and application execution should not be allowed to proceed) or, a more sophisticated use of the signature could be as a key to unlock certain secret information held within a secondary component of the application. Thus, unless the digital signature indicates the presence of an unmodified, previously authorized application program set, the secret and protected functions are inaccessible.

Note that as a variation to the process, even modules which have not been relocated from their default addresses as created by the compiler could be processed as proposed herein. In this case, the resulting "address pointers" would have offset values that are small—relative offsets within the module itself, and clearly independent of all relocations. By way of example, assume an address A within an executable module contains a relocated address pointer that references some offset within the given module. For this example, assume that the offset is 0x777. Assume also that the module is constructed to load at address 0x10000000. Then, when the module is loaded into its default location, at address A we would find 0x10000777.

Assume now that the module is relocated to address 0x5c000000. In this case, at address A, we would find 0x5c000777.

A purist would normalize the contents of address A by subtracting off the load address (either 0x10000000 in the non-relocated case, or 0x5c000000 in the relocated case). Either way this would result in a normalized value of the address A contents being 0x777, the original pure offset value. This value would be factored into the digital signature.

An alternate normalization approach would subtract off only the difference between the actual load address and the intended default address.

Using the number above, in the non-relocated case, there is no delta between the actual load address and the default load address (both are 0x10000000), thus we subtract nothing from the contents of address A and it remains 0x10000777. In the relocated case, we have a delta between the load address and the default address of (0x5c000000−0x10000000=0x4c000000). When we subtract this delta from the contents of address A we still get 0x10000777 (0x5c000777−0x4c000000). Applying the impure normalization we still get repeatability between the relocated and non-relocated cases.

Those skilled in the art will note from the above that in the purist case, we have a method which is applied identically to all modules, relocated or not, and which produces a repeatable digital signature in either case, as though all modules were built to load at address 0.

In the alternate normalization approach, we have a method which by design can be applied only to modules that have been relocated. This is done in order to make them look as though they have not been relocated from their default address.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for checking integrity of an executable module loaded into memory for execution, said method comprising:

determining a load address at which the executable module is loaded in memory for execution;

normalizing at least some content of the executable module in memory for execution to obtain normalized content corresponding to said at least some content, said normalizing employing said load address of the executable module in memory for execution and reversing, at least in part, the effect of loading the executable module in memory for execution, wherein said normalized content is independent of said load address of the executable module in memory for execution; and performing integrity analysis of a digital section of the module's content, including said normalized content, in order to detect tampering of the module at run-time after the module has been loaded into memory for execution.

2. The method of claim 1, wherein said executable module comprises a plurality of addresses, said load address comprises an address other than a default address for loading said executable module into memory wherein said executable module comprises a relocated module in memory, and wherein said method further comprises constructing a list of addresses from said plurality of addresses, each address in said list of addresses having modified content to be normalized by said normalizing, wherein said modified content of each address in said list of addresses comprises a modified address pointer.

3. The method of claim 2, wherein said normalizing content comprises normalizing said modified content of each address in said list of addresses.

4. The method of claim 3, wherein said normalizing comprises defining a temporary variable as the modified address pointer less an address offset comprising a difference between said load address at which the executable module is loaded and said default address for said executable module, said temporary variable comprising said normalized content.

5. The method of claim 4, wherein said integrity analysis comprises obtaining a digital signature of the module's content, including said normalized content, using one of a check sum function and a cryptographic function, said digital signature being independent of said load address at which said executable module is loaded in memory.

6. The method of claim 1, wherein said executable module comprises one of an audio decode module, a video decode module or a sub-picture decode module, and wherein said method is implemented by a protected service provider.

7. The method of claim 6, wherein said protected service provider comprises a descrambler for a digital video disk player.

8. The method of claim 1, wherein said performing comprises generating a digital signature of said digital section of said executable module loaded into memory, said digital signature being independent of said load address of said executable module in memory.

9. The method of claim 1, wherein said executable module comprises a dynamic link library, said dynamic link library having an auxiliary information section (.reloc) which includes a list of all addresses of said executable module having content to be modified by an operating system loader when loading the executable module into memory at other than a default address, and wherein said normalizing comprises employing information from said auxiliary information section in identifying said at least some content to be normalized.

10. The method of claim 1, wherein said at least some content of said executable module comprises addresses within said executable module.

11. The method of claim 1, wherein said performing comprises comparing a digital signature of said digital section of the executable module loaded into memory with a digital signature of the digital section of the executable module prior to being loaded into said memory.

12. A system for checking integrity of an executable module loaded into memory for execution, said system comprising:

means for determining a load address at which the executable module is loaded in memory for execution;

means for normalizing at least some content of the executable module in memory for execution to obtain normalized content corresponding to the at least some content, said means for normalizing comprising means for employing said load address of the executable module in memory for execution to reverse, at least in part, the effect of loading the executable module in memory for execution, and wherein said normalized content is independent of said load address of the executable module in memory for execution; and means for performing integrity analysis of a digital section of the module's content, including said normalized content, in order to detect tampering of the module at run-time after the module has been loaded into memory for execution.

13. The system of claim 12, wherein said executable module comprises a plurality of addresses, said load address comprises an address other than a default address for loading said executable module into memory wherein said executable module comprises a relocated module in memory, and wherein said system further comprises means for constructing a list of addresses from said plurality of addresses, each address in said list of addresses having modified content to be normalized by said means for normalizing, wherein said modified content of each address in said list of addresses comprises a modified address pointer.

14. The system of claim 13, wherein said means for normalizing content comprises means for normalizing said modified content of each address in said list of addresses.

15. The system of claim 14, wherein said means for normalizing comprises means for defining a temporary variable as the modified address pointer less an address offset comprising a difference between said load address at which the executable module is loaded and said default address for said executable module, said temporary variable comprising said normalized content.

16. The system of claim 15, wherein said integrity analysis comprises means for obtaining a digital signature of the module's content, including said normalized content, using one of a check sum function and a cryptographic function, said digital signature being independent of said load address at which said executable module is loaded in memory.

17. The system of claim 12, wherein said executable module comprises one of an audio decode module, a video decode module or a sub-picture decode module, and wherein said system is implemented within a protected service provider.

18. The system of claim 17, wherein said protected service provider comprises a descrambler for a digital video disc player.

19. The system of claim 12, wherein said means for performing comprises means for generating a digital signature of said digital section of said executable module loaded into memory, said digital signature being independent of said load address of said executable module in memory.

20. The system of claim 12, wherein said executable module comprises a dynamic link library, said dynamic link library having an auxiliary information section (.reloc) which includes a list of all addresses of said executable module having content to be modified by an operating system loader when loading the executable module into memory at other than a default address, and wherein said means for normalizing comprises means for employing information from said auxiliary information section in identifying said at least some content to be normalized.

21. The system of claim 12, wherein said at least some content of said executable module comprises addresses within said executable module.

22. The system of claim 12, wherein said means for performing comprises means for comparing a digital signature of said digital section of the executable module loaded into memory with a digital signature of the digital section of the executable module prior to being loaded into said memory.

23. A system for checking integrity of an executable module loaded into memory for execution, said system comprising:

a computing unit adapted to determine a load address at which the executable module is loaded into an associated memory for execution;

said computing unit being adapted to normalize at least some content of the executable module in memory for execution to obtain normalized content corresponding to the at least some content, said normalizing comprising employing the load address of the executable module in memory for execution and reversing, at least in part, the effect of loading the executable module in memory for execution, wherein said normalized content is independent of said load address of the executable module in memory for execution; and wherein said computing unit is further adapted to perform integrity analysis of a digital section of the module's content, including said normalized content, in order to detect tampering of the module at run-time after the module has been loaded into memory for execution.

24. An article of manufacture comprising:

a computer program product comprising computer usable medium having computer readable program code means therein for use in checking integrity of an executable module loaded into memory for execution, said computer readable program code means in said computer program product comprising:

computer readable program code means for causing a computer to effect determining a load address at which the executable module is loaded in memory for execution;

computer readable program code means for causing a computer to effect normalizing at least some content of the executable module in memory for execution to obtain normalized content corresponding to said at least some content, said normalizing employing said load address of the executable module in memory for execution and reversing, at least in part, the effect of loading the executable module in memory for execution, wherein said normalized content is independent of said load address of the executable module in memory for execution; and computer readable program code means for causing a computer to effect performing integrity analysis of a digital section of the module's content, including said normalized content, in order to detect tampering of the module at run-time after the module has been loaded into memory for execution.

25. The article of manufacture of claim 24, wherein said executable module comprises a plurality of addresses, said load address comprises an address other than a default address for loading said executable module into memory wherein said executable module comprises a relocated module in memory, and wherein said article of manufacture further comprises computer readable program code means for causing a computer to effect constructing a list of addresses from said plurality of addresses, each address in said list of addresses having modified content to be normalized, wherein said modified content of each address in said list of addresses comprises a modified address pointer.

26. The article of manufacture of claim 25, wherein said computer readable program code means for causing a computer to effect normalizing comprises computer readable program code means for causing a computer to effect normalizing said modified content of each address in said list of addresses.

27. The article of manufacture of claim 26, wherein said computer readable program code means for causing a computer to effect normalizing comprises computer readable program code means for causing a computer to effect defining a temporary variable as the modified address pointer less an address offset comprising a difference between said load address at which the executable module is loaded and said default address for said executable module, said temporary variable comprising said normalized content.

28. The article of manufacture of claim 27, wherein said integrity analysis comprises computer readable program code means for causing a computer to effect obtaining a digital signature of the module's content, including said normalized content, using one of a check sum function and a cryptographic function, said digital signature being independent of said load address at which said executable module is loaded in memory.

29. The article of manufacture of claim 24, wherein said executable module comprises one of an audio decode module, a video decode module or a sub-picture decode module, and wherein said article of manufacture resides within a protected service provider.

30. The article of manufacture of claim 29, wherein said protected service provider comprises a descrambler for a digital video disc player.

31. The article of manufacture of claim 24, wherein said computer readable program code means for causing a computer to effect performing comprises computer readable program code means for causing a computer to effect generating a digital signature of said digital section of said executable module loaded into memory, said digital signature being independent of said load address of said executable module in memory.

32. The article of manufacture of claim 24, wherein said executable module comprises a dynamic link library, said dynamic link library having an auxiliary information section (.reloc) which includes a list of all addresses of said executable module having content to be modified by an operating system loader when loading the executable module into memory at other than a default address, and wherein said computer readable program code means for causing a computer to effect normalizing comprises computer readable program code means for causing a computer to effect employing information from said auxiliary information section in identifying said at least some content to be normalized.

33. The article of manufacture of claim 24, wherein said at least some content of said executable module comprises addresses within said executable module.

34. The article of manufacture of claim 24, wherein said computer readable program code means for causing a computer to effect performing comprises computer readable program code means for causing a computer to effect comparing a digital signature of said digital section of the executable module loaded into memory with a digital signature of the digital section of the digital section of the executable module prior to being loaded into said memory.

* * * * *